US005088513A

United States Patent [19]

Ostermeyer

[11] Patent Number: 5,088,513

[45] Date of Patent: Feb. 18, 1992

[54] SUPPORT LEG FOR STICK-SHAPED WALKING AIDS

[75] Inventor: Thomas Ostermeyer, Attenweiler, Fed. Rep. of Germany

[73] Assignee: Schilling-Ostermeyer Maschinenbau GmbH, Attenweiler, Fed. Rep. of Germany

[21] Appl. No.: 675,034

[22] Filed: Mar. 25, 1991

Related U.S. Application Data

[62] Division of Ser. No. 269,789, filed as PCT/EP87/00067, Feb. 12, 1987, abandoned.

[30] Foreign Application Priority Data

Feb. 12, 1986 [DE] Fed. Rep. of Germany ....... 3604414

[51] Int. Cl.$^5$ ............ A01G 25/00

[52] U.S. Cl. ............ 135/82; 135/84

[58] Field of Search ............ 135/82, 84, 86, 81, 135/78

[56] References Cited

U.S. PATENT DOCUMENTS

| | | | |
|---|---|---|---|
| 679,468 | 7/1901 | Pratt | 135/86 |
| 2,910,995 | 11/1959 | Jacuzzi . | |
| 3,177,884 | 4/1965 | Thro | 135/81 |
| 3,741,226 | 10/1922 | Urban . . | |
| 4,135,536 | 1/1979 | Willis | 135/84 |
| 4,510,957 | 4/1985 | Frank | 135/84 |

FOREIGN PATENT DOCUMENTS

| | | | |
|---|---|---|---|
| 499091 | 1/1954 | Canada | 135/78 |
| 111023 | 6/1984 | European Pat. Off. | 135/78 |
| 1951593 | 2/1923 | Fed. Rep. of Germany . | |
| 7246457 | 4/1973 | Fed. Rep. of Germany . | |
| 3211732 | 10/1983 | Fed. Rep. of Germany . | |
| 2507284 | 5/1984 | Fed. Rep. of Germany . | |
| 1967334 | 6/1984 | Fed. Rep. of Germany . | |
| 7307800 | 3/1987 | Fed. Rep. of Germany . | |
| 196117 | 4/1923 | United Kingdom . | |
| 2131683 | 6/1984 | United Kingdom | 135/86 |
| 8806876 | 9/1988 | World Int. Prop. O. | 135/81 |

OTHER PUBLICATIONS

Medizinisch-Orthopadische Technik, vol. 105, No. 1, Jan.-Feb. 1985 (Stuttgart, DE), "Eine neue Krucken-kapsel" p. 30.

*Primary Examiner*—Henry E. Raduazo
*Attorney, Agent, or Firm*—Oblon, Spivak, McClelland, Maier & Neustadt

[57] ABSTRACT

A support leg for a canelike walking aid includes an adapter part to which a support tube of the walking aid may be fitted, a sole body which can bear on the ground, and a joint device connecting the adapter part and the sole body for permitting elastic swivelling in a direction of support between the adapter part and the sole body. The joint device is formed of a composite body including an elastic body within which are embedded stiffener components respectively connected to the adapter part and the sole body.

20 Claims, 7 Drawing Sheets

SUPPORT LEG FOR STICK-SHAPED WALKING AIDS

This application is a division of application Ser. No. 07/269,789, filed as PCT/EP87/00067, Feb. 12, 1987, now abandoned.

BACKGROUND OF THE INVENTION

The invention relates to a support leg for stick-shaped walking aids, such as for example for crutches.

A support leg of the type described above has already become known in which a ball and socket joint is provided between an adapter part shaped like a cylindrical shaft and a support arrangement in the form of a holding plate for a sole. This support leg makes it possible to improve the safety of movement considerably in that the sole, beginning with the setting down of the walking aid to its lifting again, remains constantly in flat supporting contact with the ground. By the rotating capacity of the joint device, the force transfer from the support leg to the ground is additionally improved, since in this way no relative movement can take place any longer between the sole and ground, even when the supporting tube of the walking aid is rotated around the longitudinal axis during the course of movement. Thus, the additional advantage results that even on easily scuffed floors, such as for example parquet floors, no unsightly marks from the support leg remain.

This known support leg has proven itself in the meantime in practice. Thus, for example, no particular difficulty is presented any longer in covering also longer distances, especially outdoors, with this known walking aid. Here it has of course been found that the known support leg is not particularly kind to the joints. Of course a certain impact cushioning by the sole is possible. But because the sole is optimized with regard to a good grip on the ground and to minimal wear, this cushioning is felt to be too little.

Especially for younger patients with walking impediments who are dependent on such walking aids for decades, the great need exists of providing a walking aid with which it is possible to move quickly and in such a way that the arm and shoulder joints are spared as much as possible, to preclude later secondary injuries from the start.

SUMMARY OF THE INVENTION

The object of the invention is to provide a support leg for walking aids with which the person with a walking impediment can move still safely, but simultaneously sparing the joints more and without tiring.

According to the invention, the support leg of the walking aid is equipped with a joint device that is elastic at least in the direction of support. Thus not only is the force peak caused on setting down the walking aid diminished by the remaining swing in the support tube but further the sudden load rise to maximum bearing pressure is evened out so that an approximately constant load-rise gradient of the load curve can be achieved. Walking with the walking aids equipped with the support leg according to the invention is, in this way, not only not tiring, but it effectively precludes the danger of joint injuries, even when the handicapped person regularly covers long distances with the walking aids.

A particular additional advantage of the object of the application can be seen in the fact that the joint device itself offers impact elasticity. In this way, the number of parts necessary for constructing the support leg remains reduced to a minimum. Thus it is of further advantage that in this way also the weight of the support leg can be kept low, so that the person with a walking impediment does not become burdened by unnecessary weights and additionally become tired.

By the impact-reducing function of the joint device, the sole can further be optimized to effect an optimal ground adhesion and thus a high degree of safety for the handicapped person. The joint device itself or the elastic part of the joint device can, regardless of this task transferred to the sole, be optimized with reference to optimal cushioning and absorption of relative movements between support tube and sole. By this division of functions, no compromises need be made concerning the material selection for the sole and the joint device, which leads to advantages with respect to construction engineering, since now each functional element can be designed and produced in and of itself according to special criteria.

It has been shown that methods of elastic deformation of the joint device in the range between 10 and 15 mm fully suffice already to even out and control the load-rise curve relative to the bearing pressure in the tube so that impacts acting on the movement and support apparatus of the handicapped person through the palms of the hand, the wrist, the elbow joint and the shoulder joint are considerably reduced so that not only the joints themselves but also tendons and muscles are spared and permanent injuries can be prevented effectively.

According to a further development, it is it further seen that in the joint device a relative rotating motion can occur between the support tube and the sole or the support arrangement provided for it, and during the entire step an optimal meshing of the sole with the ground can be maintained and simultaneously the scuffing of the sole on the floor and the dirtying of easily scuffed floors can be avoided. The rotatably elastic construction of the joint device has the further effect that with a relative twisting of the support tube relative to the sole, a restoring force is generated which constantly increases with the relative angle position, i.e., with the torsion angle, and which preferably increases until the torsion angle assumes a magnitude of about 35°. After this relative torsion angle, preferably either the elasticity limit of the joint device is reached or stopping bodies go into action which fix the support tube relative to the sole. In this way additional advantages result for the handicapped person relative to his safety. With free rotating capacity between adapter part and support arrangement or between support tube and sole, the handicapped person becomes unstable, namely for example when unlocking a door while bracing himself only on a stick-shaped walking aid, in that he must keep the walking aid in an unsteady balance by his hand, arm and shoulder muscles in counteracting a tilting moment that tends horizontally to swing the walking aid into the stable position of equilibrium by the forces acting on the walking aid in the area of the grip and the elbow supports. By the measures according to the application an improved subjective feeling of safety results, which generally benefits the operating safety of the walking aid.

The elastic construction of the joint device further advantageously opens the possibility that the noise generation of the support leg, despite pivotable and rotatable arrangement of the sole on the walking aid, can be reduced or the noise generation can be avoided completely. Here, the bendable and compressible elastic body as a compact part takes on all the safety-increasing and joint-sparing functions indicated above. This results not only in advantages with respect to production engineering. Moreover, this configuration also opens the possibility of minimizing the weight of the support leg and, by the integral configuration of the joint device, of completely eliminating the noise generation of the joint device. Further, this configuration of the support leg also increases the life of the joint device, because matching surfaces are no longer necessary in the area of the joint.

The configuration of the joint device according to the application advantageously opens the possibility of constructing or incorporating the adapter part for the support tube in the elastic body. The number of parts for the production of a functionally capable walking aid is further reduced in this way.

Likewise, the support arrangement for the sole with the elastic body can be combined into an integral unit, further advantageously opening the possibility of constructing the support arrangement—as known in the art—with a universal socket for various sole configurations.

The range of people who are dependent on the above-described walking aid is not limited to people of a certain weight class. Therefore the support leg to be able to be used and produced economically, must be configured so that it can be adapted to various marginal conditions connected with weight load and load dynamics. This configuration allows a well-directed control of the deformation behavior of the joint device in two respects. On the one hand, the self-cushioning of the support system can be varied by the selection of the material of the elastic material and of the stiffer components. On the other hand, by suitable variation of the mutual geometric angular position of the stiffer components or by well-directed control of the force flux from the support surface in the area of the support arrangement to the force transfer surface in the area of the adapter part, a suitable movement and deformation behavior of the support leg can be achieved. In this way, while maintaining the basic concept by simply varying the geometric and/or materials engineering parameters, an adaptation of the walking aid to various types of users can be successfully done.

This is possible in the simplest way with the further development where this arrangement results in the additional advantage that the stiffer components can be used to limit the freedom of movement of the support tube with respect to the sole to within allowable ranges. Thus, into the support leg there is integrated a kind of safety package that supports the handicapped person in safe movement.

The further development has additional advantages with respect to production engineering. With this further development, one of the stiffer components can be constructed as an adapter part of the support tube and another stiffer component can be constructed as one piece with the support arrangement, additionally resulting in a saving of weight.

An advantageous further development of the support leg the joint device receives, on the one hand, a sufficient freedom of movement with respect to tilting or pivoting to provide a sufficient step angle and also with respect to torsional freedom between support tube and sole. On the other hand, with this configuration there remains a very large clearance for configuring the shear section or the elastic body through which an adjustment of the cushioning path is possible according to the respective requirements. Especially advantageous here is the fact that despite a relatively large cushioning path, the lower end point of the support tube can be brought relatively near to the ground surface, so that even at extreme angles of setting down which can occur when, e.g., the handicapped person is walking downhill outdoors, a tilting of the sole over its front edge line is precluded.

A further configuration advantageously opens the possibility, by simple variation of the length of the revolving collar, of changing the volume of the shear section that determines the cushioning properties without having to change the production process.

The bearing pressure of the support tube can be transferred to the support leg very evenly, resulting in the additional advantage that no intermediate adapter is necessary and the standardized support tube can be connected directly to the support leg. Further, by varying the proportion by which the hollow cylinder is covered by the elastic body, the deformation behavior of the composite body can be controlled.

In a simple way the inner area of the adapter part remains reliably protected from dirt. This not only minimizes the wear between the contact surfaces of support tube and adapter part but further the generation of noise in this area is kept as little as possible. The production of annular rings or the surface configuration of the inner covering layer does not entail more expense, since these are constructed integrally with the elastic material or with the elastic body.

Advantageously, the deformation behavior of the support leg is adjusted individually to take into account individually the use conditions of the walking aid and the requirements of the handicapped person.

A further configuration can additionally influence the maximum critical angle of the horizontal swing between support tube and sole. By simultaneously influencing the volume of the shear section, the critical torsion angle between support tube and sole can additionally be acted on.

When the support plate is constructed of an annular plate, on the one hand the weight of the support leg can be further reduced, and further the adapter part in the form of a hollow cylinder can be given a relatively large axial movement clearance so that the point of application of force of the support tube on the lower end of the adapter part can be even lower.

When the support leg in the configuration receives an outer lining surface that essentially follows a paraboloid shape, there results an extremely favorable force path, i.e., essentially constant stress ratios through the cross section of the elastic body. This additionally increases the life and improves the operating reliability of the support leg.

When the cylindrical section of the adapter part is completely embedded in the elastic body, on the one hand there results a force transfer over as large a surface as possible and, further, the additional advantage that the adapter part is reliably protected from corrosion. Simultaneously, at the upper end area of the support leg, a sealing of the inner recess of the adapter part in the form of a hollow cylinder automatically results, reliably keeping intact the once produced connection between support tube and adapter part.

When the adapter part has a thin covering layer on the inside in which several longitudinal grooves are formed, distributed evenly around the periphery and preferably ending before the upper edge of the elastic body, the elastic material receives the possibility, on forcing in or compressing of the support leg, of slipping into the longitudinal grooves. In this way, the production tolerances no longer act negatively on the matching or the resistance to removing the support leg from the support tube. Since the longitudinal grooves are not brought up to the upper edge of the elastic body, this edge can fulfill an extremely intensive sealing function, by which appearances of corrosion are effectively precluded.

A further development protects the support plate from damages without having to increase the production engineering expense.

The components of the elastic material forming the elastic body are preferably formed of a rubber mixture that can be vulcanized. This measure opens the possibility of vulcanizing the elastic material together with the stiffening inserts, support bodies and stiffening surfaces on the one hand and, on the other hand, together with the subsequent bracing surfaces on the adapter part and on the support arrangement, resulting in a very solid connection which can withstand the shear stresses occurring in these areas. By suitable pretreatment of the parts to be connected to the elastic material, e.g., by sandblasting these components, the connection can additionally be improved and other special agents, such as for example solvents, can be used to effect an additional micromeshing between the individual components. This leads not only to the fact that the life of the joint device can be kept very long. This further development is also advantageous with respect to production engineering since in principle nothing changes in the production process, even with the most varied configuration of the stiffening bodies and/or the connection parts for the adapter part on the one hand and the support arrangement on the other hand. This makes possible the economical production of a variety of support legs for the most varied requirements with respect to the field of application or the ideas of the handicapped person.

When the stiffer components of the elastic joint device consist of aluminum, the weight of the support leg can be reduced further and thus the handicapped person has an additional burden removed. Here, it is additionally advantageous that the material aluminum is well suited for a pressure contact with the sole on the one hand or with the support tube of the walking aid on the other hand, so that during production of the support leg, only two materials need to be used, which entails advantages with respect to production engineering.

It has been shown that the joint device can fully meet the requirements posed by the handicapped person in all movement phases when the critical pivoting angle is limited to about 30°. This critical angle itself is then sufficient when the handicapped person moves relatively quickly on a steep street. Simultaneously, this determination of the critical pivoting angle greatly reduces the danger of the support leg tipping over, enabling the operating safety of the walking aid to be increased.

The critical pivoting angle can be determined either by selection or by adjustment of the spring characteristic of the joint device or by additional stopping bodies. This further development has the advantage that in this case the critical angle can be determined precisely, independently of the weight of the handicapped person.

The support leg according to the invention is designed so that the deformation path of the joint device in no way affects an area in which the sole is provided. This opens the possibility of continuing to construct the support leg in the area of the support arrangement with a surrounding edge for holding various bottom bodies, and the surrounding edge then functions as a universal socket for the bottom bodies. This surrounding edge is then preferably constructed integrally with the joint device and the upper and lower connecting parts, i.e., with the support arrangement embedded in the elastic bodies. In this way, with the exception of the sole, the entire support leg can be produced in one operation, resulting in advantages with economic respect. The low number of parts causes elimination also of the connecting and matching surfaces, enabling the noise generation of the support leg to be further reduced.

Like the relative pivoting angle, the maximum torsion angle between support tube and sole can be precisely determined, and here a limit to about 35° has proven optimal. This limitation of the angle assures, on the one hand, that during the entire step, the ground contact of the sole is kept solidly unchanged. On the other hand, this critical angle is still small enough to confer on the handicapped person the above-indicated subjective feeling of safety when, for example, he is bracing himself on a walking aid while opening a door.

BRIEF DESCRIPTION OF THE DRAWINGS

Below, based on diagrammatic drawings, several embodiments of the invention will be explained in more detail. There are shown in.

DETAILED DESCRIPTION OF THE PREFERRED EMBODIMENTS

Figure 1:
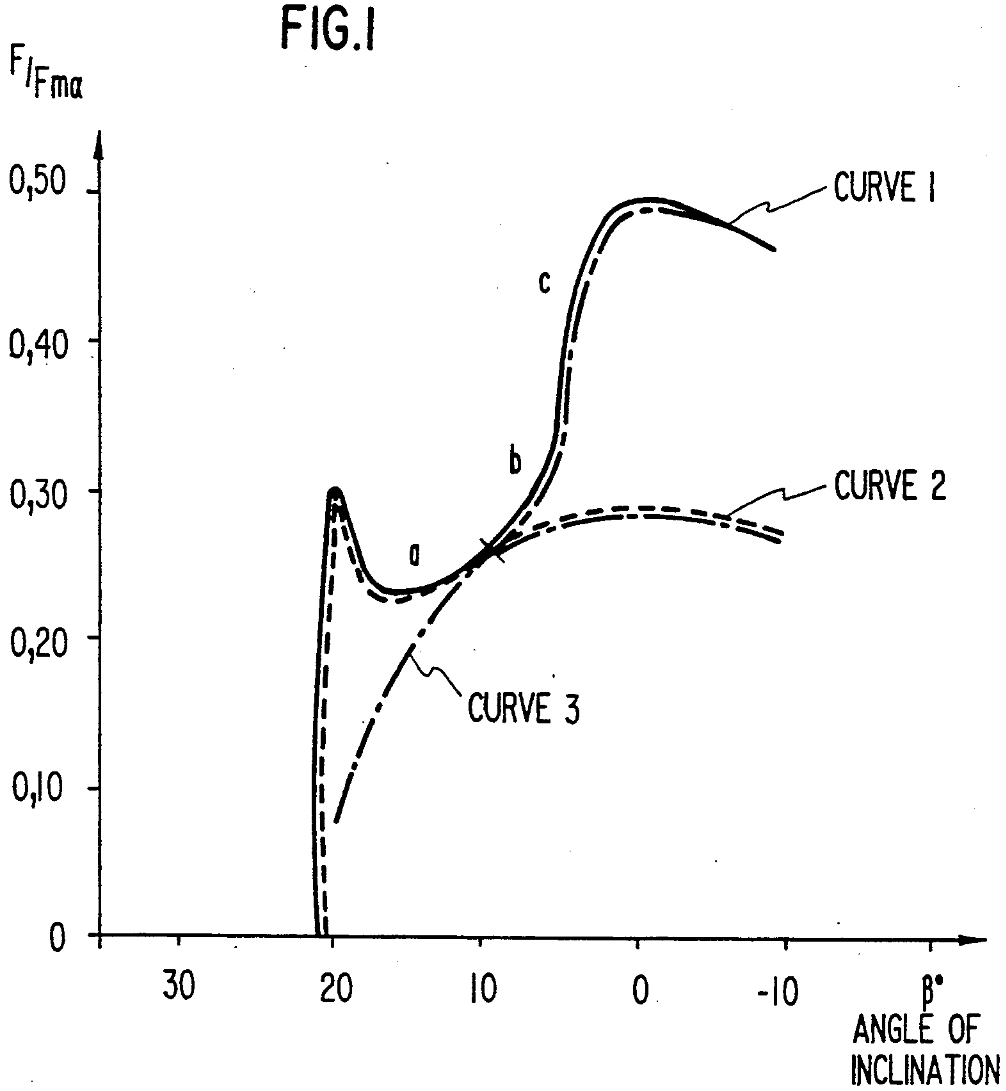
FIG. 1 a diagram for the representation of the course of the load of the stick-shaped walking aid in the longitudinal direction of the stick during a step cycle, FIG. 2 a diagram for the representation of the rotation angle of the support tube, occurring during one step cycle, around the longitudinal axis, FIG. 3 a diagrammatic sketch for the representation of the load condition of the stick-shaped walking aid and of the destabilizing tilting moment caused by this, FIG. 4 a first embodiment, shown partially in section, of the joint device of the support leg, FIG. 5 a view in radial section of a second embodiment of the joint device of the support leg, FIG. 6 a view similar to FIG. 4 of a third embodiment of the joint device of the support leg, FIG. 7 a diagrammatic representation of the support leg area of the walking aid to clarify the load condition for the case in which the axis of the stick-shaped walking aid encloses a relative pivoting angle with ground normal, and this force analysis is based on the embodiment according to FIG. 6, and FIG. 8 on a larger scale, a view similar to FIG. 4 or 6 of a fourth embodiment of the joint device of the support leg.

FIG. 1 shows the course of load for a stick-shaped walking aid of conventional construction in the longitudinal direction of the tube. On the abscissa is recorded inclination $\beta$ of the stick-shaped walking aid relative to the surface normal going through the fulcrum of the support leg. On the ordinate is recorded the ratio of the bearing pressure acting in the tube to the maximum load strength of the walking aid.

The diagram according to FIG. 1 shows three courses of curves, and curve 1 reflects the load situation that applies to a handicapped amputee or to a person wearing a cast. Curve 2 represents the course of load that applies to the handicapped person who needs the walking aid only as support, since both legs must not or cannot be completely stressed, and in this case the left leg and the right crutch are moved simultaneously. Curve 3 finally represents a course of load to be sought which can be achieved with the support leg to be described in more detail below.

It can be seen from curve 1 represented in FIG. 1 that three load ranges are to be differentiated during a step cycle. In load range a, the course of force results in that the walking aid, after the forward swing, is set on the ground with a resting swing and after that is stressed immediately. This results in a first force peak, which comprises already 60% of the maximum strength of the support tube. In load range b, there occurs a constant increase in load in that the handicapped person increasingly puts his weight on the walking aid. In load range c finally, the stick of the walking aid or the support tube takes on the entire weight in addition to the acceleration forces that are caused by the swing during walking.

Figure 2:
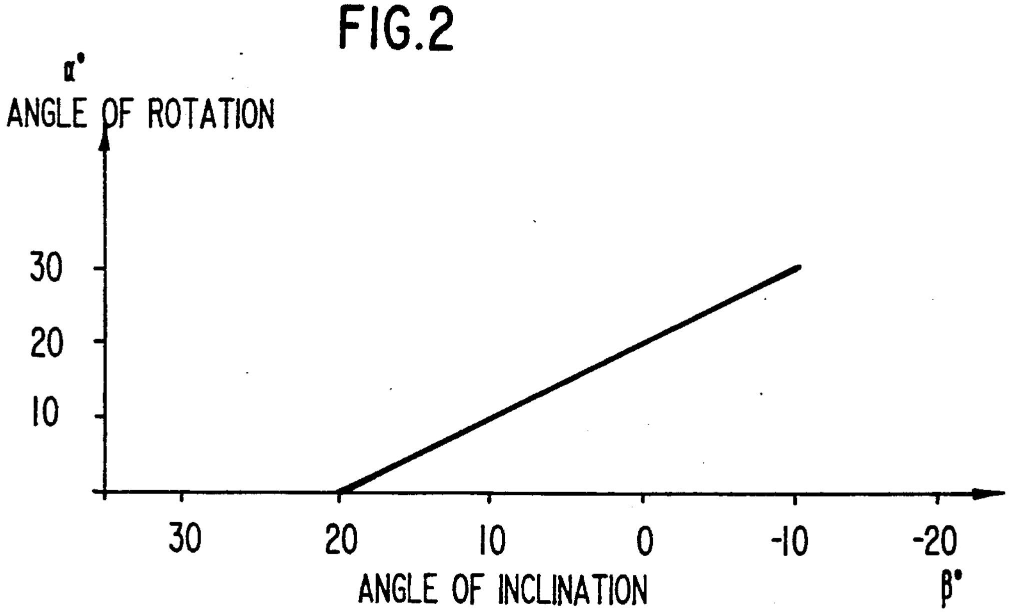

As can be seen from FIG. 2, the anatomy of the handicapped person results simultaneously in a predetermined angle of rotation $\alpha$ of the walking aid around the axis of the stick. This angle of rotation $\alpha$ increases in a first approximation in linear fashion with the change in angle of inclination $\beta$. By these ratios it is clear that the course of load occurring with a conventional stick-shaped walking aid entails a considerable load on the entire support apparatus of the handicapped person, by which not only joints, but also tendons and muscles are subjected to an increased wear. Of course, in the course of the load according to curve 2 the load is considerably reduced. But this course of load can be adopted only when the handicapped person can place a load on both legs with 25% of the body weight. Further, it has been established that in particular the sudden load increase on setting the crutches down, i.e., in load range a, can cause permanent injuries in the area of the joints, tendons and muscles, which occurs particularly when the handicapped person comes to depend relatively early on such walking aids and plays sports.

Figure 4:
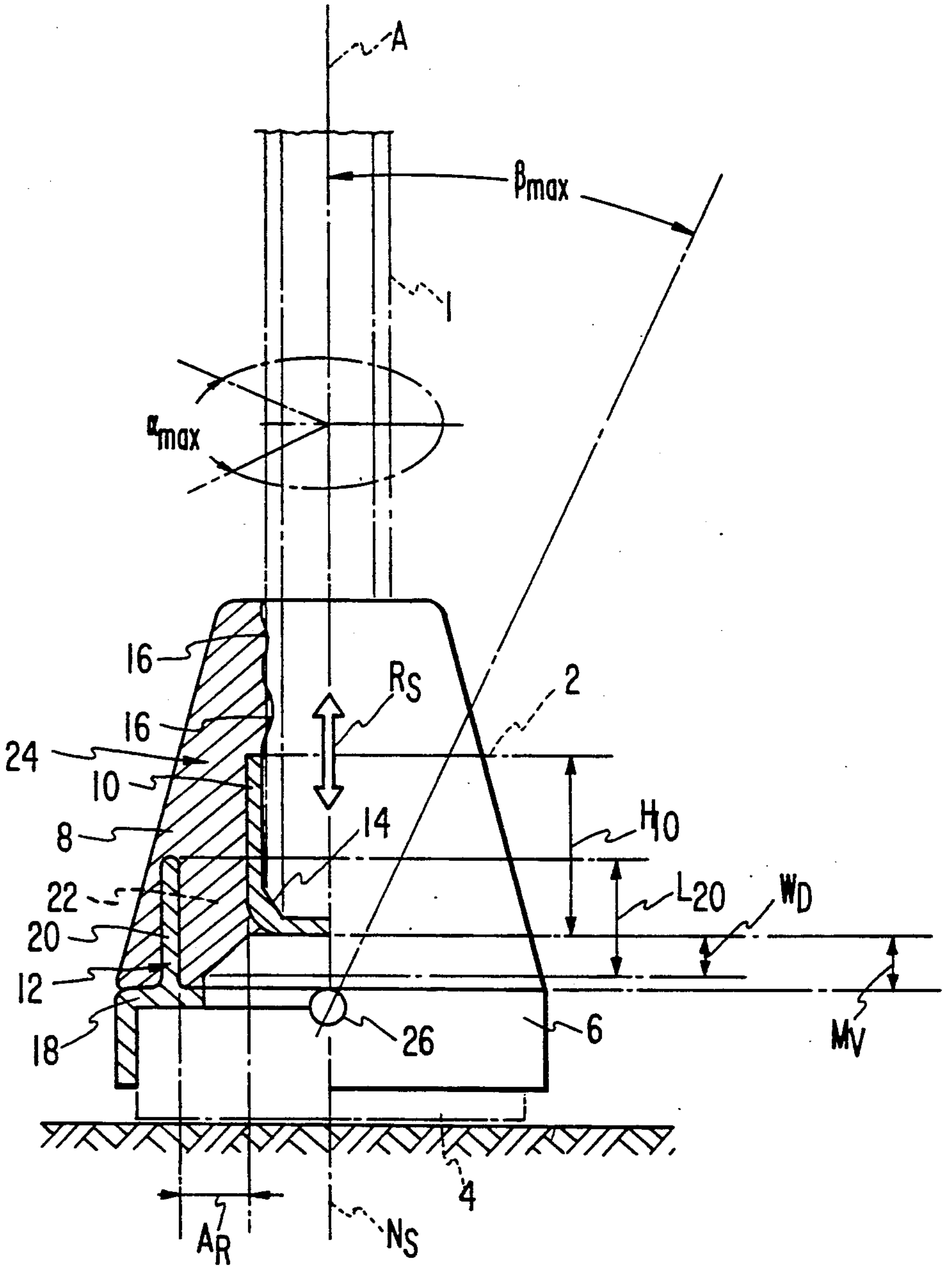

FIG. 4 shows a first embodiment of the support leg with which a load curve corresponding to curve 3 shown in FIG. 1 can be achieved. This load curve is distinguished by a force increase to the force maximum that is as even as possible, so that impact stresses on the movement and support device of the handicapped person are excluded to the greatest extent possible. Here, there is further integrated into the support leg a joint device that guarantees, under support of a sole, a free horizontal swing capacity of the support tube of the walking aid in the range of +25° to 30° to the normal of the support surfaces and a relative twisting capacity of the support tube around the longitudinal axis relative to the support surface in the range of +25° to −25°. The walking aid provided with the support leg according to the invention is thus always in a position, during the entire step cycle, to provide optimal friction contact ratios to the ground, even when the handicapped person is moving on steep ground.

FIG. 4 indicates in dashed lines the lower end of support tube 1 of a stick-shaped walking aid. This support tube 1 is connected to a support leg 2 in a rotation- and sliding-resistant fashion and support leg 2 receives on the bottom a sole 4, which can have various forms and is constructed, for example—as shown in FIG. 4—as a cylindrical disk body. Sole 4 can, for example, be constructed as a turning body which has, on its one surface, a particular gripping structure and, on its other surface, steel pins which can dig into icy ground. Sole 4 braces in an axial direction on a preferably flat support arrangement that will be described in more detail below. Laterally, sole 4 is fixed by a surrounding edge 6 which, for example, can be constructed as one piece with the support arrangement for sole 4. Preferably, the surrounding edge is constructed as a universal socket for a variety of bottom bodies of varying configuration, so that the handicapped person, depending on the ground condition present, can quickly change the sole and thus create optimal safety conditions.

Support leg 2 is configured so that support tube 1 can swing horizontally relative to sole 4 at a maximum angle of inclination $\beta_{max}$ of about 25° to 30° relative to a normal $N_S$ of a support surface to all sides and simultaneously can twist relative to sole 4 around an axis A at a maximum angle of rotation $\alpha_{max}$. Here the arrangement is such that the horizontal swing capacity over angle $\beta$ and the twisting capacity around angle $\alpha$ occur elastically.

In addition to the capacity of support tube 1 freely to twist and swing horizontally relative to sole 4, the support leg is configured so that the joint device integrated into it is constructed elastically in support direction $R_S$, to confer on the support leg an impact-cushioning characteristic, with which the load peaks of the load curve shown in FIG. 1 can reliably be reduced.

For this purpose, the support leg consists essentially of an elastic composite body whose elastic material 8 is connected with stiffer components 10 or 12 into an integral unit.

The one stiffer component 10 forms, in this embodiment, an adapter part for the lower end of support tube 1. For this purpose, this adapter part 10 is constructed in an essentially cup-shaped, i.e., annular, fashion and has, in the lower area, a radial shoulder 14 on which the lower end face of support tube 1 is braced. Adapter part 10 is engaged with fit on the support tube, to prevent relative movements between adapter part 10 and support tube 1. Above adapter part 10, elastic material 8 forms a pair of annular rings 16, by which a solid friction contact can be produced between elastic material 8 and support tube 1. In this way, the inside of adapter part 10 is reliably protected from the effects of dirt.

Second stiffer component 12 is an integral component of the above-mentioned support arrangement for sole 4 and, in the embodiment according to FIG. 4, it is formed by a plate or annular plate 18. This annular plate can again be constructed as one piece with above-mentioned surrounding edge 6. But this is not absolutely necessary for the function of the support leg. Rather, it is conceivable that a border for sole 4 is fastened on the support arrangement detachably, but resistant to rotation and sliding, in the form of plate 18.

Annular plate 18 exhibits, on the side facing away from sole 4, a stabilizing collar arrangement extending in the direction of axis A of support tube 1 and formed by a rotating annular stabilizing collar 20. Stabilizing collar 20 is placed at a radial distance $A_R$ to the partially axially offset outer surface of concentric adapter part 10 which itself forms a stabilizing portion, and is completely embedded in elastic material 8, preferably vulcanized in it. Annular plate 18 is further offset at an axial offset measurement $M_V$ to the lower edge of adapter part 10 so that between stiffer components 10 and 12 a shear section 22 of elastic material 8 is provided by which the characteristics of the joint integrated into support leg 2 can be controlled. Shear section 22 continues on the side facing away from support leg 4 into a sealed section 24, in which annular rings 16 are constructed.

The effectiveness of shear section 22 provided between stiffer components 10 and 12 additionally depends on the ratio of the dimesions of stabilizing collar 20 and adapter part 10 to one another. Here, especially the ratio of total axial length $L_{20}$ of stabilizing collar 20 to height $H_{10}$ of the adapter part is significant. By suitable matching of the geometries and the angular positions of stiffer components 10 and 12 to one another and with respect to the points at which the bearing pressure is introduced or conveyed further to support tube 1, the deformation behavior of support leg 2 can be varied within wide limits in that the above-mentioned parameters are matched to the physical features of elastic material 8. This matching allows optimal adjustment of axial cushioning path $W_D$ and specifically according to the respective individual requirements of the handicapped person.

In FIG. 4, reference symbol 26 represents the hypothetical fulcrum of the joint device integrated into the support leg. During one step cycle, support tube 1 swings horizontally essentially around this fulcrum 26 by an angle of up to 40°. Here—as shown in FIG. 1—a positive angle of inclination $\beta$ of up to 25° first appears. This angle then becomes increasingly smaller in the course of the step cycle, becomes zero at the moment of maximum force stress and finally assumes negative values in the range of up to −15°, after which the walking aids are raised from the ground.

It has been shown that it is advantageous to limit the maximum relative angle of horizontal swing $\beta_{max}$ to a suitable limiting value to prevent support tube 1 from being set down with respect to the sole and to the ground at such a large angle of inclination that, on stressing support tube 1, a tipping over of sole 4 occurs. The limiting of pivoting angle $\beta_{max}$ can, for example, be done in that the joint device receives a progressive spring characteristic. The critical angle can further be controlled in that total axial length $L_{20}$ of stabilizing collar 20 is suitably selected so that this collar 20 can function as a sto, starting with a certain pivoting angle.

Figure 3B:
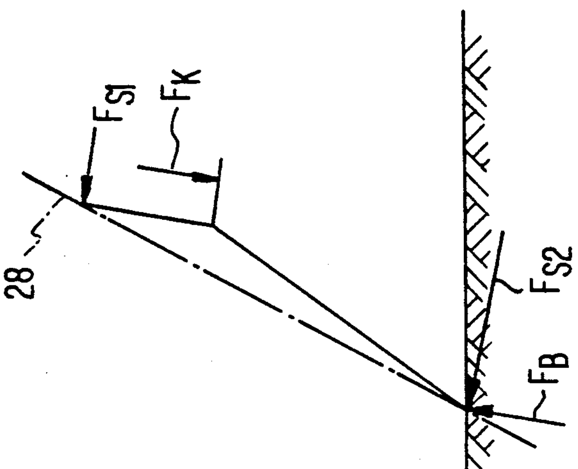
Figure 3A:
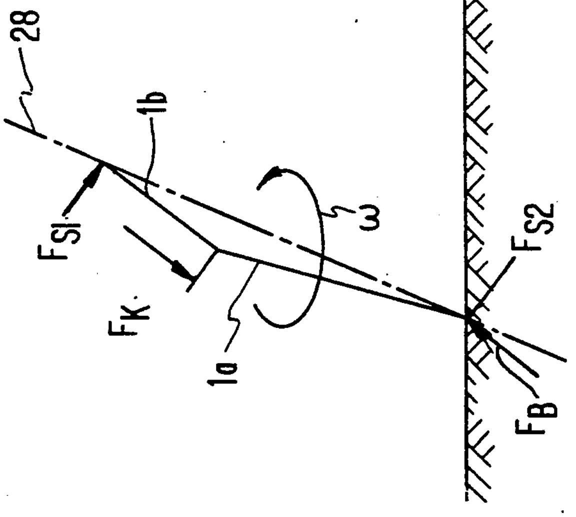

As already explained above, the anatomy of the human body during a step cycle with the aid of the walking aid causes a torsional movement of support tube 1 at an angle of rotation $\alpha$ of about 30°. With solid fixing of the lower end of support tube 1 in adapter part 10 and with rotation-resistant connection of sole 4 to annular plate 18 of the support arrangement, the elastic composite body is in a position to receive this relative twisting under elastic deformation of shear section 22. For this purpose, it can be advantageous suitably to dimension or configure the shear section in the peripheral direction to well-directed control of the flexibility in the peripheral direction. The moment of shear section 22 opposite the direction of rotation becomes increasingly greater with an increase of the torsional angle. Shear section 22 is preferably configured so that after a maximum torsional angle $\alpha$, further twisting is opposed by a considerable moment of resistance so that additional stopping bodies in elastic material 8 can be supported. This measure leads to the advantageous effect explained in further detail with reference to FIGS. 3A and 3B:

FIG. 3A represents the load condition of a crutchlike walking aid for the case where the handicapped person braces himself laterally, for example when he wants to perform an activity with the other hand, for example opening a door. In this case, the upper part of the walking aid is stressed by force couple $F_{S1}$ and $F_K$, and $F_K$ represents the bearing pressure introduced by the palm of the hand into the crutch grip and $F_{S1}$ represents the reaction force in the elbow area. This moment generated by bearing pressure $F_K$ and the reaction elbow force $F_S$ induces, in the area of the support surface, a force couple $F_B$ and $F_{S2}$, by which a static force equilibrium is maintained in the plane of FIG. 3A shown in FIG. 3A through the stick axis and vertical to the ground. It can be seen from the representation according to 3A that forces $F_{S1}$ and $F_K$ occurring in this load condition are in complete equilibrium with bearing pressures $F_B$ and $F_{S2}$ only when all forces lie in the drawing plane of FIG. 3A opened up by support tube sections 1*a* and 1*b*. In this plane, axis 28, also represented in dashed lines, also goes through the upper and the lower fulcrum of the walking aid. As soon as the walking aid is swung slightly out of the drawing plane of FIG. 3A, which occurs for example when the walking aid is stressed obliquely, support tube 1*a* and 1*b* attempt to rotate out of the unstable position shown in FIG. 3A around axis 28 (as indicated by arrow $\omega$) into the stable position shown in FIG. 3B. To prevent this, the handicapped person must, with conventional walking aids that have a freely rotatable ball and socket joint in the area of the support leg, counteract this tilting moment by suitable load on the handles and elbow support, i.e., by varying the direction of forces $F_{S1}$ and $F_K$, impairing the subjective feeling of safety of the handicapped person. With the embodiment of the support leg according to FIG. 4, the handicapped person is supported when applying this opposing moment in that the twisting movement around angle occurs against an increasingly larger opposing force, enabling the above-described uncertainty to be eliminated.

Elastic material 8 is preferably formed from a vulcanized rubber in which stiffer components 10 and 12 are vulcanized. These latter components 10 and 12 preferably consist of aluminum to keep the weight of support leg 2 as small as possible. With the support leg shown, optimal conditions with respect to the adhesion between support leg and ground are guaranteed on the one hand in that the material for sole 4 is optimized in this respect, and by the joint device integrated in support leg 2, a constant flat contact with the ground is maintained. By suitable matching of the geometry of the composite body parts to the force flux in the support leg and/or the physical features of elastic material 8, the cushioning behavior in the axial direction can further be adjusted and thus adapted individually to the requirements of the handicapped person.

Different from the embodiment represented, adapter part 10 can also be constructed as a shaft part that can be inserted into the inside of support tube 1. In a further modification, it can be provided that surrounding edge 6 is formed not as one piece with annular plate 18 but as a component of a separate part that can be fastened on stiffer components 12.

In a further modification, it can be provided that a lower edge 30 of shear section 22 tapers not in a straight line conically upward, but runs according to a precalculated curve to the lower end of the upper stiffer element 10. In this way, the deformation behavior of the elastic body can additionally be influenced.

Finally, additional stopping bodies can be embedded in elastic material 8 to precisely establish the maximum angle of inclination $\beta_{max}$ and the maximum angle of rotation $\alpha_{max}$.

Figure 5:
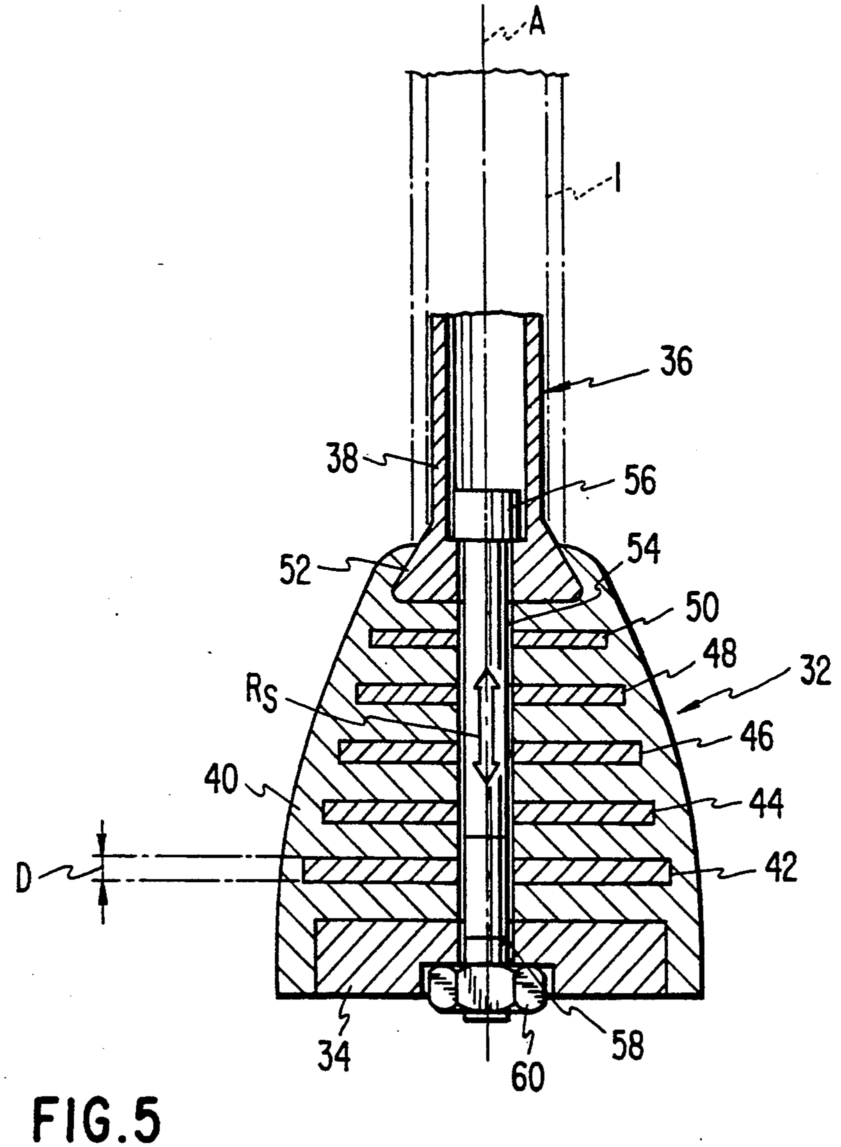

In FIG. 5 another embodiment of the support leg is described which has a deformation behavior similar to the support leg according to FIG. 4. In FIG. 5, sole 4 and surrounding edge 6 are not shown in detail. The surrounding edge can preferably be fastened detachably on a support plate 34 of support leg 32. The fastening on support tube 1 occurs in this embodiment by an adapter part 36 that exhibits a hollow cylinder shaft 38, which is forced into the inside of support tube 1.

Support leg 32 is again constructed as an elastic composite body, and elastic material 40 takes on a multiplicity of rigid components 42 to 50. These stiffer components are formed by stiffening plates which are placed parallel to support plate 34 and at a distance to one another. Stiffening plates 42 to 50 are graduated in diameter. Thus, the diameter preferably decreases steadily from below upward. Thickness D of stiffer components 42 to 50 is also larger in the lower part of support leg 32 than in the upper area, to control in this way the deformation behavior of support leg 32.

Adapter part 36 exhibits an end on the bottom side with a widening 52 rotatably embedded in elastic material 40 so that adapter part 36 is an integral component of support leg 32.

Widened lower section 52 of adapter part 36, stiffening plates 42 to 50 and support plate 34 exhibit central recesses, not shown in detail, that are constructed, in the embodiment shown in FIG. 5, concentrically to axis A. At least one draw-in and centering spindle 54, which holds on its top end an anchoring head 56 and, on its bottom end, holds or is connected tension-proof to a threaded section 58, runs through these recesses. This threaded section is in functional engagement with an adjusting nut 60, with which composite body 32 can be compressed in support direction $R_S$. By stressing draw-in and centering spindle 54, the deformation behavior of support leg 32 can be influenced so that the cushioning behavior can be adapted to the individual requirements of the handicapped person.

As in the embodiment according to FIG. 4, as a preferred elastic material 40, vulcanizable rubber is again provided in which stiffer components 42 to 50, as well as support plate 34 and adapter part 36, are vulcanized. The stiffer components can again consist of aluminum or also of plastic.

Draw-in and centering spindle 54 preferably consists of steel so that a flexible spindle is provided, which can easily adapt to the joint deformations of support leg 32.

This embodiment is also in a position to allow angles of rotation of the magnitude of 25° to 35° between support tube 1 and support plate 34, and angles of inclination $\beta$ between axis A of support tube 1 and the normal on support plate 34 of the magnitude of +30°, without reaching the limits of elastic deformation. The cushioning behavior can be influenced and controlled by suitable matching and adaptation of thickness D and the gradation of the diameter of stiffer components 42 to 50 to the geometry of support plate 34 and widening 52 of adapter part 32, while taking into account the physical features of elastic material 40.

The embodiment described above according to which the elastic body is divided into a multiplicity of elastically deformable individual sections is especially advantageous for certain mixtures of elastic material. The stress condition occurring in the elastic material can be evened out here over the entire height of the support leg, resulting in good material exploitation with a simultaneous increase in the life of the support leg. When the bottom-side end of hollow cylinder shaft 38 exhibits a widening 52, in which elastic material 8 is embedded, in addition to advantages with respect to production engineering, there result additional advantages to the effect that dirt can be kept away from matching surfaces. Here it is advantageous to force the adapter part into the inside of said stick-shaped walking aid.

By placing the centering spindle under more or less great stress, the cushioning behavior can be changed in the axial and in the peripheral direction, by which an adaptation to the weight of the user or to the condition of the ground can be performed. By matching the geometry of the stiffening plates to the physical material properties of the elastic material, the deformation behavior can be acted on in a well-determined manner, enabling achievement of optimal deformation and cushioning values on the one hand and a sufficient fatigue strength on the other hand.

An especially advantageous configuration is described below with reference to FIGS. 6 and 7. This support leg is designated with reference number 62. It is again constructed as a composite body in which, between two stiffer components 64 and 66, an elastic material 68 is provided which again preferably is constructed of rubber that can be vulcanized. Upper stiffer component 64, as an adapter part, and lower stiffer component 66, as a support plate in the construction are molded on this elastic material 68. The dashed lines again indicate a surrounding edge 70 for a sole 72 that is again only indicated. Surrounding edge 70 can be constructed either integrally with support plate 66 or be fastened to it detachably, resistant to rotation and sliding.

Upper stiffer component 64 represents an adapter part for a lower end of support tube 1. For this purpose, a central cylindrical recess 74 is provided in which the lower end of support tube 1 is put. In the upper area of adapter part 64, additional elastic seals are provided to carry out a sealing of the matching surfaces outward—as in the embodiment according to FIG. 4.

In this embodiment also, a joint device is integrated into support leg 62, which again is constructed essentially frustum-shaped, and the joint device is not only rotationally and flexurally elastic, but is elastic also in support direction $R_S$. To provide the joint function, surface 76 of adapter part 64 facing sole 72 is constructed concave, and specifically so that it is a component of a spherical segment. Accordingly, surface 78 of support plate 66 facing away from sole 72 and facing surface 76 of adapter part 64 is convex and is likewise constructed as a component of a spherical segment surface. Elastic material 68 is received between both spherical segment surfaces 76 and 78. By molding on elastic material 68, elastic material 68 functions again as a spring body stressed by pressure, stress and shearing, and the spring body makes it possible for adapter part 64 and thus support tube 1 to swing horizontally, relative to the normal $N_S$ of the support surface, in all directions by an angle of inclination $\beta$ and to twist relative to support plate 66 by torsional angle $\alpha$, and these angles $\alpha$ and $\beta$ move in the ranges described above. Thus, elastic material 68 simultaneously sees to it that the course of force in support tube 1 approaches curve 3 according to FIG. 1 as much as possible, to prevent load peaks which tire the handicapped person and could overtax his support apparatus over the long term. The integral construction of support leg 62 in combination with the solid matching connection of adapter part 64 with the lower end of support tube 1 further sees to it that the joint and impact-cushioning function of the support leg occurs completely silently, and again—as also in the already-described embodiment—the possibility is opened that the support leg can be optimized with respect to the contact between sole 72 and ground and with respect to the impact-cushioning capacity.

Figure 6:
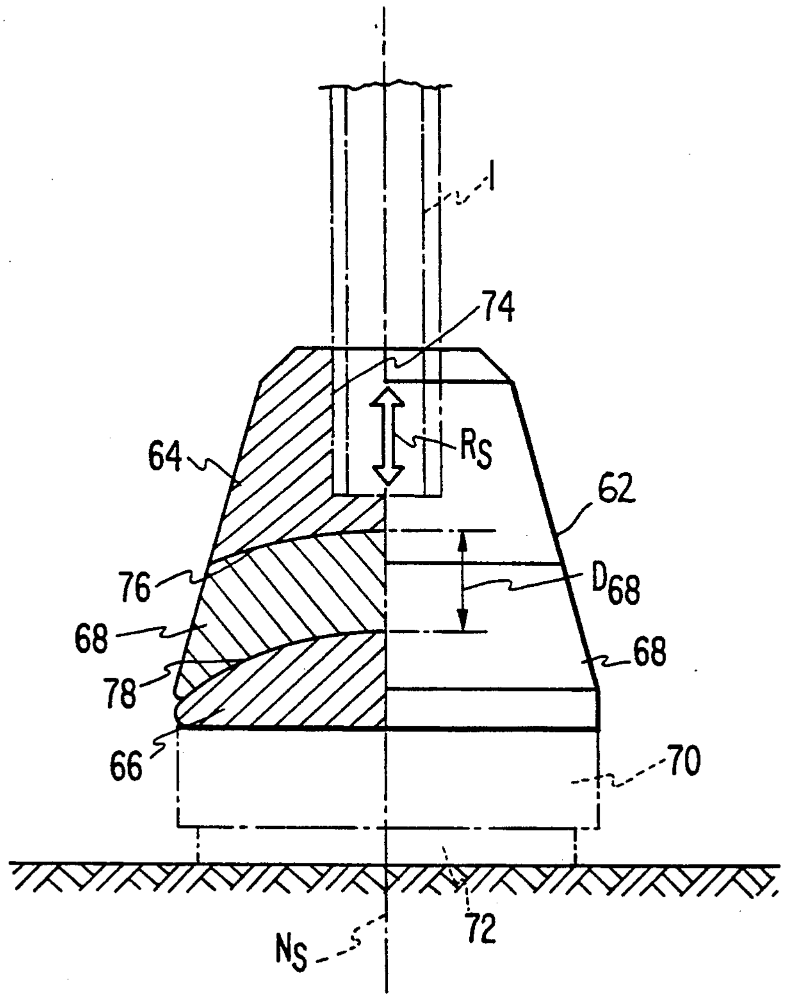
Figure 7:
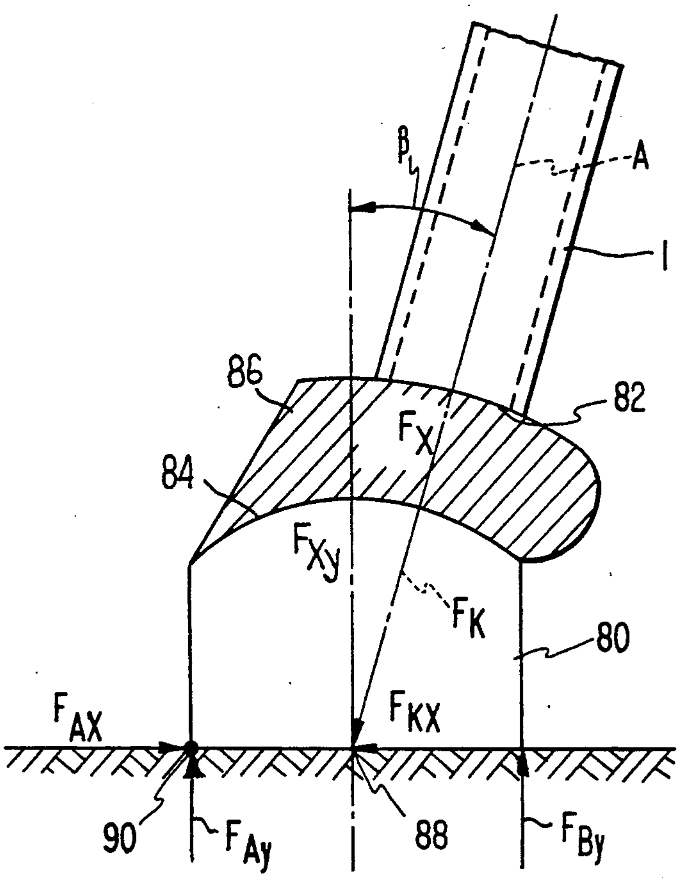

The spherical-segment-shaped configuration of the surface of adapter part 64, enclosing the elastic material on the one hand and support plate 66 on the other hand, results not only in a relatively simple configuration of elastic body 68 which in this way can be constructed with an essentially constant thickness $D_{68}$. The spherical-segment shape, which is preferably configured so that spherical segment surfaces 76 and 78 are constructed essentially concentrically when support leg 62 is constructed as a rotationally symmetrical body, results in an effect that is further described with reference to FIG. 7:

FIG. 7 diagrammatically shows the deformation behavior of the support leg according to FIG. 6 for the case where support tube 1, for example at the beginning of the step cycle, is set on the ground at an angle of inclination $\beta$. Reference number 80 indicates a component which, in the embodiment according to FIG. 6, corresponds to the unit of support plate 66, surrounding edge 70 and sole 72. Adapter part 64 is omitted in the representation according to FIG. 7 and is reduced to a supporting spherical segment surface 82. Between supporting spherical segment surface 82 and one of the other supporting spherical segment surface 84 corresponding to spherical segment surface 78 according to FIG. 6, an elastic block material 86 is provided that is connected solidly to spherical segment surfaces 84 and 82.

FIG. 7 shows the case in which support tube 1 is stressed with a force $F_K$. This load causes spherical surfaces 82 to shift under deformation of elastic material 86 so that axis A of support tube 1 runs essentially through the central support point of sole 80. Thus, spherical surfaces 84 and 82 are centered at their common central point, which is preferably selected to coincide with central point 88 of the support surface. Thus the force of the stick also runs through central point 88, resulting in an even distribution of vertical force over the entire periphery of sole 80, which is indicated in FIG. 7 by the two vertical force components $F_{AY}$ and $F_{BY}$. With this even distribution of vertical force components, even with large pivoting angles $\beta$, the case cannot occur in which sole 80 tilts over front support point 90 of sole 80, which could be the case with conventional support legs.

Also in the embodiment described with reference to FIGS. 6 and 7, it is possible to adjust or vary the joint and cushioning characteristic by influencing the geometry of spherical segment surfaces 76 and 78 with respect to the physical properties of elastic material 68. Thus it is possible, by modifying the embodiment shown, to embed other stiffening components in elastic material 68 or to provide, purposefully and at certain points, hollow spaces by which the deformation behavior is controlled. It is further possible to provide stopping bodies which—also as in the embodiments described above—see to it that angle of inclination $\beta$ and/or angle of rotation $\alpha$ remain limited to the limiting values discussed above.

Also in this embodiment, as in the embodiment according to FIG. 5, aluminum can be used as the material for adapter part 64, for support plate 66 and optionally for the stiffening bodies inside elastic material 68. But it is also possible to use plastic here, advantageously opening the possibility of constructing surrounding edge 70 integrally with support plate 66 and thus further reducing the number of components of support leg 62.

The particular advantage of the embodiment described above consists in that the elastic body constantly effects a self-centering of the adapter part with the bottom side of spherical part with every relative pivoting angle between support tube and sole. Even with the largest step angles or relative pivoting angles between support tube and sole, there results thus no tilting moment over the front edge line of the sole. Due to this fact, the elastic body can be constructed somewhat thicker so that an enlarged clearance for variation of the cushioning characteristic of the joint device remains.

When elastic body 68, viewed in axial section, has an essentially constant thickness $D_{68}$, the self-centering effect mentioned above of the support tube occurs even more reliably. Further, the loads on the elastic body are greatly evened out over the cross section. Here it is advantageous that the edge surfaces of the elastic body be in direct contact with both support surfaces that have the shape of spherical segments which essentially have a common spherical central point. With this embodiment also, the thickness and/or the edge configuration of the elastic body is advantageously matched to the physical properties of the elastic material. By the design of the support surfaces and/or the edge surfaces of the elastic body, the stress condition in the body during the various load conditions can be influenced and thus the life of the joint device can be optimized. With stiffening inserts, the deformation behavior of the elastic body can be changed. Additionally, the critical angle, pivoting angle and torsional angle between the support tube and the sole can be precisely established.

When adapter part 64 has a recess 74 for receiving support tube 1, the lower fulcrum of the support tube can be brought as close as possible to the sole, which benefits the stability of the support leg.

Figure 8:
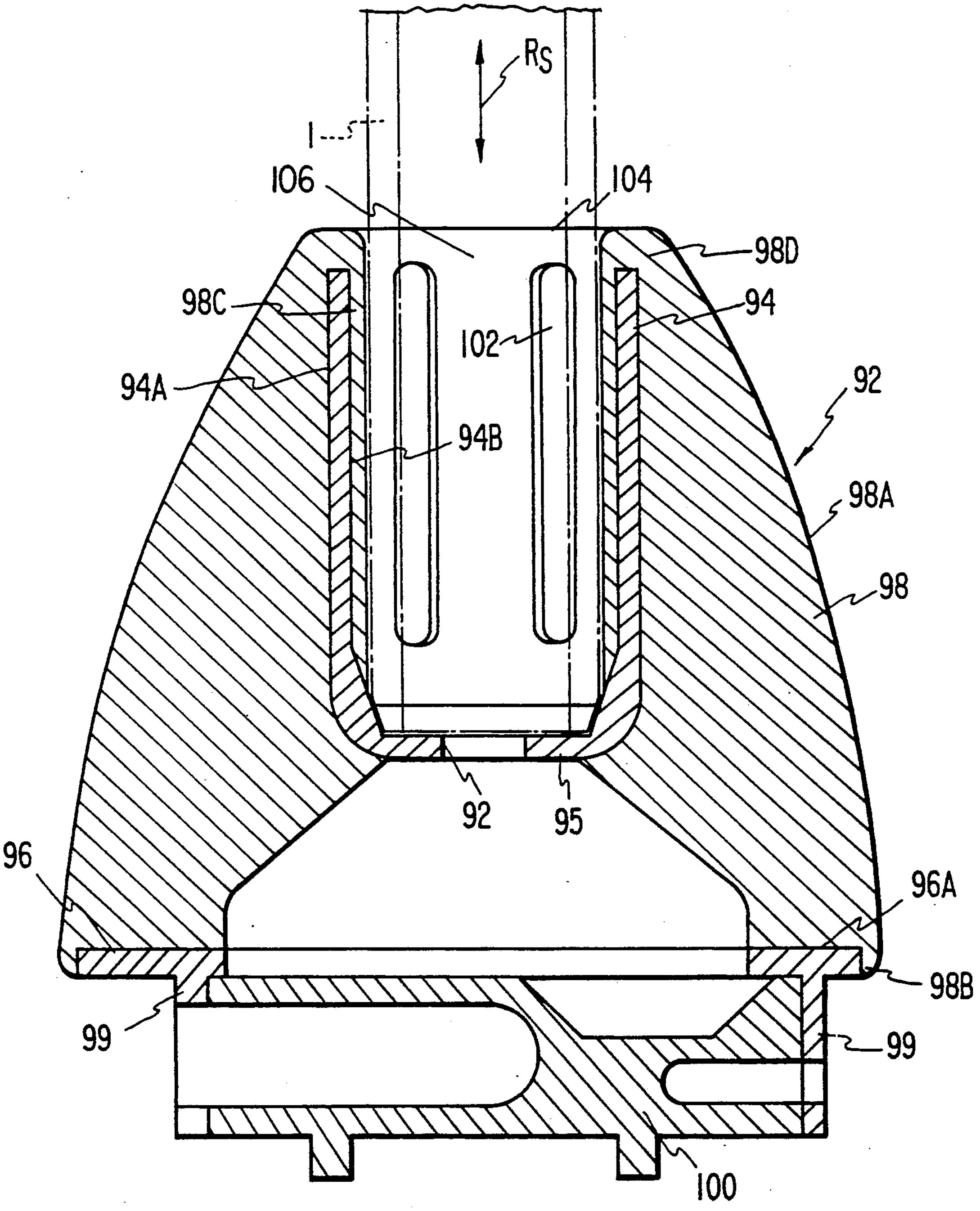

FIG. 8 shows another preferred embodiment of the support leg for stick-shaped walking aids. The support leg of this embodiment is designated by reference number 92. The view according to FIG. 8 differs from the ones described above in that a somewhat different sectional view was selected. The views to both sides of the middle line are obtained through sectional planes that are perpendicular to each other.

As in the embodiments described above, support leg 92 represents a joint device that is elastic in support direction $R_S$. It is further constructed rotatably and flexurally elastic in all radial planes. The support leg exhibits here also a composite body in which an elastic material 98 is connected with stiffer components 94 and 96. Elastic material 98 is again preferably constructed of rubber that can be vulcanized, on which the stiffer components are preferably molded on. The stiffer components can preferably consist of aluminum or plastic.

Similar to the embodiment according to FIG. 4, upper stiffer component 94 in FIG. 8 is constructed as a hollow cylindrical body that is open on the top side and, on the side facing the bottom, has a radial shoulder 95. Component 94 thus has a cup shape, and on the bottom side a vent 97 is provided. Other stiffer components 96 form the support plate for a border, not represented, of a sole likewise not represented. For the coupling on of the border, support plate 96 exhibits an axial extension 99, by which support body 100 itself for the sole is fixed.

In further agreement with the embodiment according to FIG. 4, hollow cylinder 94 forms the adapter part for support tube 1, which is indicated with dashed lines. For this purpose, the cylindrical section of element 94 extends by a relatively large axial distance upward. Between the cylindrical section and annular surface 96A, which is offset in the axial as well as in the radial direction to cylindrical section 94A, there is elastic material 98 of joint device 92. The axial distance between radial shoulder 95 and annular surface 96A is in the range of 8 to 15 mm, so that a sufficient cushioning path is provided.

To even out the stresses occurring in elastic material 98, elastic material 98 has an outer profile 98A that essentially has the shape of a hyperboloid. The elastic material further encloses an outer surface of support plate 96 to construct an edge protection 98B.

To produce a connection between support tube 1 and support leg 92 that is protected against torsion and coming apart, elastic material 98 is also drawn into the inside of hollow cylinder 94. Cylindrical inner surface 94B thus receives a thin coating 98C, which is connected as one piece by an impact collar 98D to the remaining part of elastic material 98.

Coating 98C has several longitudinal grooves 102 evenly distributed over the periphery and ending before upper edge 104 and preferably before the lower edge of coating 98C. On forcing in of support tube 1, elastic material 98, in the area of coating 98C, can thus slip into these grooves, counteracting tolerance problems. Because grooves 102 end before upper edge 104, a ringlike, closed sealing section 106 remains, which prevents penetration of impurities.

The connection between elastic material 98 and stiffer components 94 and 96 can be further improved by roughening the stiffer components before the connection, for example by a sandblasting operation. Additionally, solvents with elastic material and/or adhesives can be used.

For forcing in support tube 1, it is advantageous to apply a lubricant on coating 98C. Excess lubricant can then be pushed into longitudinal grooves 102. For this way there results, especially with suitable selection of the lubricant, a very tight connection between support leg 92 and support tube 1.

It has been shown that, with an elastic cushioning path $W_D$ of 5 to 15 mm, an optimal compromise can be achieved with respect to the cushioning characteristic on the one hand and to the form stability of the support leg on the other hand. But it is also possible, by varying this cushioning path, purposefully to establish centers of gravity, when this is advantageous for the actual case of handicap.

The embodiments described above of the support leg according to the invention all have in common the fact that, while assuring a very high degree of safety for the handicapped person, they are quite silent and, by varying the geometry and the material properties of the components used by matching these parts to one another, the respective needs of the handicapped person depending on the walking aid can be focused on. Thus, for example, with the embodiment according to FIG. 4, stabilizing collar 20 can be varied not only with respect to length, but also with respect to inclination and profiling in the peripheral direction, so that the deformation behavior changes purposefully according to a determined pattern in the movement cycle. Axial cushioning value $W_D$ is controlled in that a more or less deep recess is provided in sole 4 or in support plate 18.

The invention thus provides a support leg for stick-shaped walking aids, such as for example crutches, whose support tube is connected with an adapter part, which is connected by a pivotable and rotatable joint connection with a support arrangement for a sole. The joint device is integrated in the support leg and is constructed elastically at least in the support direction, but is preferably also rotatably elastic. Preferably, the joint device is formed by a composite body in whose elastic material are embedded stiffer components for transfer of the bearing pressures from the sole to the support tube of the walking aid. The support leg in this way is composed of very few components, is silent and protects the entire support apparatus of the handicapped person in that load peaks are effectively diminished by the support leg.

I claim:

1. A support leg for a canelike walking aid, comprising:

a cylindrical adapter part to which a support tube of a walking aid may be fitted to extend in a direction of support;

a sole body adapted to bear on the ground; and joint means connecting said adapter part and said sole body for permitting elastic swivelling about an axis extending generally in a direction of support between said adapter part and said sole body, said joint means comprising a composite body including:

a) one stiffener component comprising said adapter part, b) another stiffener component comprising a support plate supporting said sole body and being axially spaced from said adapter part by an axial space along the direction of support, and a cylindrical stabilizing collar extending substantially perpendicularly from said support plate and having a diameter greater than said adapter part, wherein said stabilizing collar is positioned around, and is radially spaced from, said adapter part, and c) an elastic body in which said stiffener components are imbedded, except in said axial space, wherein a portion of said elastic body between said adapter part and said stabilizing collar comprises a shear section, whereby said stiffener components can pivot, shift and twist relative to one another in response to loads applied from said support tube by shearing of said shear section, said shearing being stabilizied and guided by said stiffener components.

2. Support leg according to claim 1, wherein the elastic body has characteristic physical features and the shear section has a radial length and the amount of said axial spacing is selected as a function of at least one of the physical features of said elastic body and the radial length of said shear section.

3. Support leg according to claim 1, wherein the adapter part is formed by a hollow cylinder having an inner shoulder on a bottom side thereof.

4. Support leg according to claim 1, wherein the support plate is formed by an annular plate.

5. Support leg according to claim 4, wherein said support plate is bordered peripherally by an elastic material.

6. Support leg according to claim 1, wherein said elastic material is formed from a rubber mixture that can be vulcanized.

7. Support leg according to claim 6, wherein said stiffer components are vulcanized together with the elastic material.

8. Support leg according to claim 6, wherein the stiffer components consist of aluminum.

9. Support leg according to one of claims 6 or 7, wherein one of said adapter part and said support arrangement consists of one of plastic and aluminum.

10. Support leg according to claim 1 wherein said elastic swivelling has a maximum angle of about 30°.

11. Support leg according to claim 1 wherein said axial space has an axial length between 5 and 15 mm.

12. Support leg according to claim 1 wherein said another stiffener component has a surrounding edge for receiving various sole bodies.

13. Support leg according to claim 1, wherein a maximum angle of rotation of the joint means is about 35°.

14. Support leg according to claim 1 wherein said elastic body has annular rings forming a seal for the support tube.

15. A support leg for a canelike walking aid, comprising:

an adapter part to which a support tube of a walking aid may be fitted, said support tube having a direction of elongation;

a sole body adapted to bear on the ground; and joint means connecting said adapter part and said sole body for permitting elastic swivelling about an axis extending generally in the direction of elongation, said joint means comprising a composite body including:

a) one stiffener component comprising said adapter part;

b) another stiffener component supporting said sole body and being axially spaced from the one stiffener component by an axial space along the direction of support elongation, wherein said one stiffener component and said another stiffener component have stabilizing portions spaced in the axial and in a radial direction transverse to said axial direction, relative to the direction of elongation of said support tube, to form a shear section, and c) an elastic body in which said stiffener components are embedded, and provided in said shear section except in said axial space such that said elastic body is not compressed between said stiffener components, whereby said stiffener components can pivot, shift and twist relative to one another in response to a load applied from said support tube while being stabilized and guided by said axially spaced stiffener components.

16. Support for leg according to claim 15, in which the adapter part is formed by a cylindrical body, and the another stiffness component has a support plate, wherein said elastic body is a rotationally symmetrical elastic body incorporated between an outer cylinder surface of said adapter part and a surface of said support plate facing away from the sole body.

17. Support leg according to claim 16, wherein an outer surface of the rotationally symmetrical elastic body has the form of a paraboloid.

18. Support leg according to claim 3, wherein a cylindrical section of the adapter part is completely embedded in said elastic body.

19. Support leg according to claim 18, wherein said adapter part has, on an inner side thereof, a thin covering layer in which are formed several longitudinal grooves distributed evenly over a periphery thereof, which grooves end below an upper edge of said elastic body.

20. Support leg according to claim 1, wherein the adapter part is formed from a hollow cylinder having a height selected as a function of one of a height of said stabilizing collar arrangement, the physical features of said elastic material and said axial offset between said adapter part and said support plate, and so as to provide a predetermined shear value.

* * * * *